Patented July 15, 1947

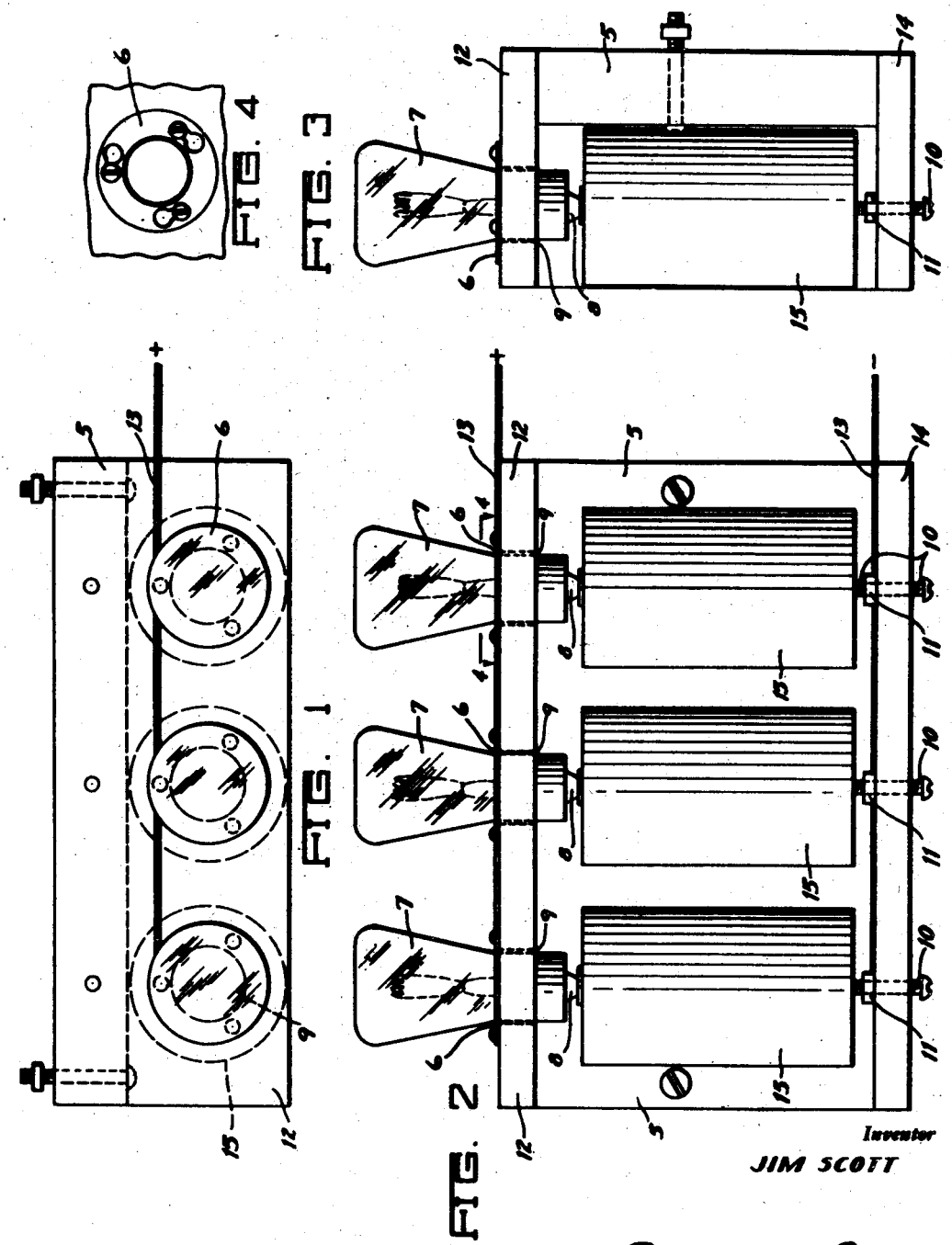

2,424,059

UNITED STATES PATENT OFFICE 2,424,059

APPARATUS FOR RECONDITIONING OF DRY CELL BATTERIES

Jim Scott, Crossroads, N. Mex.

Application May 7, 1945, Serial No. 592,350

1 Claim. (Cl. 320—4)

This invention relates to dry cell batteries, such as are used for flashlights, cigar lighters, testing apparatus, and all kinds of portable and fixed apparatus. It is well known that dry cell batteries have a very limited period of active life. It lasts for three to four hours if not absolutely continuous use is made of the battery so that periods of rest alternate with those of operation.

It has been found by experiment that the life period of a dry cell may be extended by a reconditioning process which consists in submitting the battery to the influence of a low voltage current for a short period. The dry cell battery which is worn out and whose terminal voltage has, therefore, decreased beyond the limit is thereby reconditioned and works at approximately full voltage for a period of time which is from 4 to 6 times that of the reconditioning or treatment. The reconditioning process may be repeated several times with the same effect.

Reconditioning takes also place if the treatment period is lengthened but the extension is not a multiple of the treatment time but is shorter.

The invention mainly consists in an improved apparatus which will permit to revive exhausted dry cell batteries for an appreciable time and to lengthen their duration. This apparatus may be installed anywhere, but it is especially suitable for installation on cars, which are provided with an electric installation operating at 6 volts. Moreover, the amperage drawn by an exhausted battery during the reconditioning treatment is very low so that the apparatus may be installed directly without special resistances or the like and is thus very simple.

The apparatus is illustrated in the accompanying drawing by way of example, the example shown being designed for low reconditioning amperages.

In the accompanying drawing:

Figure 1 is a plan view.

Figure 2 is a side elevation.

Figure 3 is a front elevation of the reconditioning device.

Figure 4 is a plan view of a detail.

The apparatus consists of a box 5 closed on three sides and open on one side. The open side may be closed by a lid but preferably is open and gives permanently access to the interior of the box. The top plate 12 of the box 5 carries a number of socket plates, or base plates 6 for light bulbs 7 such as are used for the voltage employed for reconditioning. These plates as usual are provided with the means for fixing the bulbs.

In the example shown it is assumed that the apparatus is to be used on a car or is to be connected with a car installation. The lamp bulbs 7 used are therefore of the type used in a car, for instance, 50 watt auto bulbs. Their socket portions 6 project into the interior of the box through openings 9. The lower tip 8 of the bulb socket which projects into the interior of the box may be used directly as one of the operative contacts for the dry cell.

The other series of contacts is preferably formed by screws 10 engaging sleeves 11 mounted on or in the base board 14 of the box 5. A number of bulb socket plates 6 and screw contacts 10 are arranged which are connected in parallel by means of metal strips 13.

The box has the required height for accommodating the dry cells 15 to be reconditioned or regenerated and the insertion may be performed through the open side and after suitable adjustment of the screws.

As indicated, the dry cells are connected with their central or positive pole to the lamp tips 8 which are connected with the positive or plus pole of the battery, while the outer shell of the dry cell, forming its negative pole is in contact with the screws 10 which are connected with the negative end of the car battery (Figure 2).

When the dry cell has been placed in the apparatus low voltage current is passed through them for a varying period of time. For instance, if the current is passed through the dry cell for 5 minutes, the cell will be able to operate normally for at least 25 to 30 minutes. After being exhausted it can again be reconditioned for a similar period and reconditioning as a rule may be repeated several times.

Periods of reconditioning of 10 minutes and more have been found useful and have added about one hour to the life of the dry cell. Protracted reconditioning periods lead to overtreatment and to destruction of the dry cell. The treatment period depends on the nature of the dry cell and on its degree of exhaustion.

The bulbs act as an indicator. They should light up to a certain extent and this lighting up also tests the battery and the dry cell. The extent to which the bulb lights up may be regarded as a test for the condition of the dry cell, other conditions being equal. Therefore, in this way dry cells which would not operate in a satisfactory manner after revival may be eliminated. Moreover, dry cells which have been revived already repeatedly may be eliminated.

The invention consists in the above described arrangement and not in specific parts which are subject to change.

I claim:

An apparatus for regenerating dry cell batteries comprising a box, contacts for connecting the dry cells, a light bulb, a socket for the same fixed on the box, one of said contacts being formed by the tip contact of the light bulb fixed on the box and another adjustable contact mounted in said box facing the light bulb.

JIM SCOTT.

REFERENCES CITED

The following references are of record in the file of this patent:

UNITED STATES PATENTS

| Number | Name | Date |
|---|---|---|
| 1,247,022 | Smith | Nov. 20, 1917 |
| 2,000,571 | Oswald | May 7, 1935 |
| 2,036,547 | Siemon | Apr. 7, 1936 |
| 2,199,322 | Skinner | Apr. 30, 1940 |
| 2,369,033 | Eubanm | Feb. 6, 1945 |

FOREIGN PATENTS

| Number | Country | Date |
|---|---|---|
| 607,172 | France | Mar. 23, 1926 |
| 617,336 | Germany | Aug. 16, 1935 |